J. H. SHELTON.

Assignor to the BENEDICT & BURNHAM MANUFACTURING COMPANY.

FURNITURE-KNOBS.

No. 7,498. Reissued Feb. 6, 1877.

Witnesses.

J. H. Chumney

Clara Broughton.

John H. Shelton
Inventor
By Atty.

Wm. C. Earle.

N. PETERS, PHOTO-LITHOGRAPHER, WASHINGTON, D. C.

UNITED STATES PATENT OFFICE.

JOHN H. SHELTON, OF WATERBURY, CONNECTICUT, ASSIGNOR TO THE BENEDICT AND BURNHAM MANUFACTURING COMPANY.

IMPROVEMENT IN FURNITURE-KNOBS.

Specification forming part of Letters Patent No. 109,459, dated November 22, 1870; reissue No. 7,498, dated February 6, 1877; application filed August 17, 1876.

*To all whom it may concern:*

Be it known that I, JOHN H. SHELTON, of Waterbury, in the county of New Haven and State of Connecticut, have invented a new Improvement in Drawer-Pulls; and I do hereby declare the following, when taken in connection with the accompanying drawings and the letters of reference marked thereon, to be a full, clear, and exact description of the same, and which said drawings constitute part of this specification, and represent, in—

Figure 1:
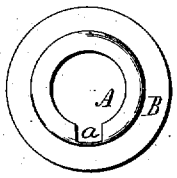
Figure 2:
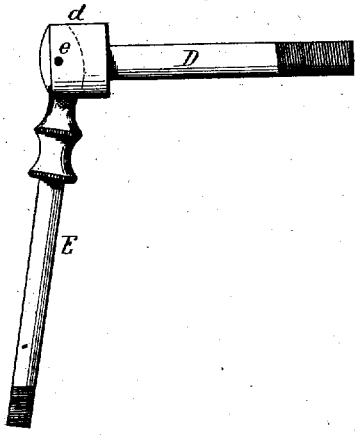
Figure 3:
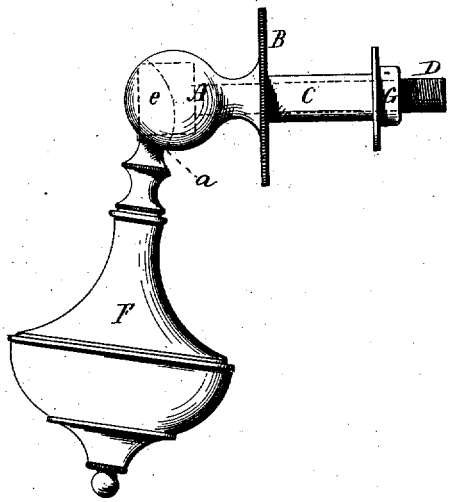

Figure 1, a view of the socket. Fig. 2, a view of the handle-spindle and threaded rod; and in Fig. 3 a view of the pull complete.

The nature of the invention consists in the construction, as more fully hereinafter set forth, of pulls to be attached to articles of furniture, and will be found to relate more particularly to drawer-pulls, so constructed that when not in use they may be turned down from a horizontal position into a vertical or nearly a vertical position.

To enable those skilled in the arts to make and use my invention, I will describe the same.

A shows the socket to receive the threaded rod and the handle-spindle. This socket A may be made of brass, or any suitable metal, and the metal used in forming the same is continued in the manufacture so as to form behind the socket the disk B. The socket is constructed with a notch, *a*, upon its under side, for the purposes more fully hereinafter described. Upon the rear of the disk B is secured, in any convenient way, about centrally, the neck C. This neck is made true on all sides, and after it has been affixed to the disk B an opening is made through the rear end of the socket and the neck, to allow the threaded rod D to be passed through the same. D is a threaded rod made of any suitable length, and provided with the slotted head *d*, to receive the end of the spindle E, secured therein by a pintle. E shows the spindle constructed with the end *e* secured within the slotted head *d*, and also with a handle, F, secured upon its free end.

Such being its construction, the mode of attachment may be thus set forth: An opening of the proper size to allow the neck C to enter and fill the same is made in the drawer of the bureau or table to which the pull is to be attached. The neck then is inserted therein. The threaded rod to which the spindle is connected is passed through the socket, the head upon the rod filling the socket, while a nut, G, is screwed over the threaded portion of the rod, and firmly holds the knob to the drawer. As the spindle is free to turn in the head *d* within the socket, the knob and its handle can be turned down into a vertical or nearly vertical position, the notch *a* in the socket allowing the spindle to enter therein in order to assume such vertical position. Without this notch the knob could not attain such vertical position, because the spindle, being hinged within the socket, would strike the edge of the socket long before it approached a vertical position, and be arrested by the socket in that position. The notch, therefore, is essential to such vertical position, and, when required for use, the handle may be readily turned to the horizontal or pulling position.

The metal portions of the invention may be ornamented to any extent, thus giving a highly-finished appearance to the article.

Having thus set forth my invention, what I claim as new is—

The combination, in a drawer-pull, of the following elements: A socket, the interior of which is of circular form in section at right angles to its axis, the pull-spindle being within said socket, and the socket constructed with a notch, *a*, in its edge, less in width than the internal diameter of the socket, substantially as described, and for the purpose of allowing the spindle to fall into said notch and thereby assume nearly a vertical position.

JOHN H. SHELTON.

Witnesses:

CHARLES DICKINSON,

E. L. BRONSON.